(12) United States Patent
Stearns et al.

(10) Patent No.: US 11,653,797 B2
(45) Date of Patent: *May 23, 2023

(54) COMPOSTING TOILET

(71) Applicant: MEDAL TECHNOLOGIES, LLC, Findlay, OH (US)

(72) Inventors: Larry Stearns, Van Buren, OH (US); Michael Stearns, Van Buren, OH (US); Kevin A. Bartchlett, Arcadia, OH (US)

(73) Assignee: MEDAL TECHNOLOGIES, LLC, Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/363,163

(22) Filed: Jun. 30, 2021

(65) Prior Publication Data
US 2021/0321836 A1  Oct. 21, 2021

Related U.S. Application Data

(63) Continuation of application No. 16/576,973, filed on Sep. 20, 2019, now Pat. No. 11,071,420.
(Continued)

(51) Int. Cl.
A47K 11/02 (2006.01)
A47K 11/12 (2006.01)

(52) U.S. Cl.
CPC ............. *A47K 11/02* (2013.01); *A47K 11/12* (2013.01)

(58) Field of Classification Search
CPC .................................. A47K 11/02; A47K 11/12
See application file for complete search history.

(56) References Cited

U.S. PATENT DOCUMENTS

| 2,983,090 A | 5/1961 | Harm |
| 3,786,463 A | 1/1974 | Peltz et al. |

(Continued)

FOREIGN PATENT DOCUMENTS

| CN | 2458977 Y | 11/2001 |
| CN | 101797129 A | 8/2010 |

(Continued)

OTHER PUBLICATIONS

Sales: "Nature's Head Self-Contained Composting Toilet Installation Manual and User's Guide Saving Our Water for Tomorrow", , Jan. 1, 2017 (Jan. 1, 2017), pp. 1-12, XP055949063, Retrieved from the Internet: URL:https://natureshead.net/file_download/24/Natures_Head_Installation_Manual_Users_Guide_2017-edited.pdf.

(Continued)

*Primary Examiner* — Janie M Loeppke
(74) *Attorney, Agent, or Firm* — Ward Law Office LLC; Jacob M. Ward

(57) ABSTRACT

A composting toilet assembly has a composting bin with an agitator, a toilet bowl, and a urine bottle. The agitator has an agitator handle configured to actuate the agitator. The agitator may have a ratchet assembly including a hub, a clutch bearing disposed in the hub, and a pair of brass bushings disposed in the hub. The toilet bowl is disposed on the composting bin. The toilet bowl has a main body with a recess. The recess may have a first portion and a second portion with a partition wall. Each of the first portion and the second portion has an opening. The urine bottle is in fluid communication with the bowl. The urine bottle is configured to receive urine. The urine bottle has a drain, a handle, and a sensor. The sensor may have a light and be configured to detect a predetermined urine level in the urine bottle.

20 Claims, 5 Drawing Sheets

Related U.S. Application Data

(60) Provisional application No. 62/790,044, filed on Jan. 9, 2019.

(56) References Cited

U.S. PATENT DOCUMENTS

| | | | |
|---|---|---|---|
| 4,240,164 | A | 12/1980 | Lind |
| 5,027,472 | A | 7/1991 | Goodman |
| 5,551,097 | A | 9/1996 | Short |
| 5,896,592 | A | 4/1999 | Santa Cruz et al. |
| 6,260,216 | B1 | 7/2001 | Lejgren |
| 9,247,852 | B2 | 2/2016 | Trott |
| 9,854,949 | B2 | 1/2018 | Trott |
| 2005/0055758 | A1* | 3/2005 | Marston ............... E03D 11/11 4/321 |
| 2007/0130678 | A1* | 6/2007 | Ikeda ............... A47K 11/02 4/434 |
| 2008/0168597 | A1* | 7/2008 | Bartlett ............... E03D 11/11 4/321 |
| 2012/0066825 | A1 | 3/2012 | Birbara et al. |
| 2016/0235262 | A1 | 8/2016 | Trott |
| 2017/0007082 | A1 | 1/2017 | Li |

FOREIGN PATENT DOCUMENTS

| | | |
|---|---|---|
| CN | 209172162 U | 7/2019 |
| JP | 2010260039 A | 11/2010 |
| WO | 2007098455 A2 | 8/2007 |
| WO | 2016195359 A1 | 12/2016 |

OTHER PUBLICATIONS

Anonymous: "Nature's Head Composting Toilets—The Official Site: FAQs", , Jan. 1, 2018 (Jan. 1, 2018), pp. 1-3, XP055949072, Retrieved from the Internet: URL:https://natureshead.net/faqs/.

\* cited by examiner

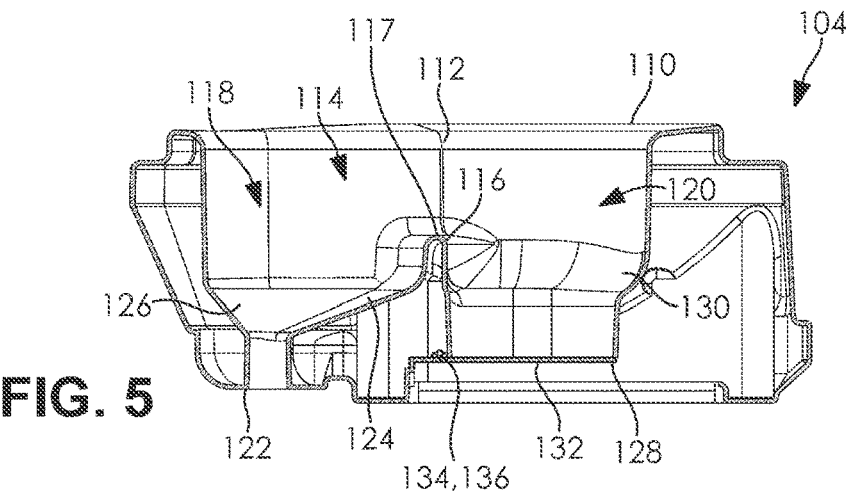
FIG. 5
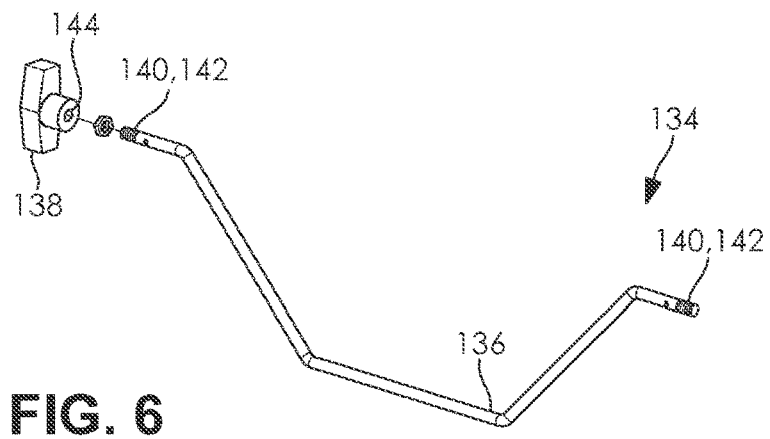
FIG. 6
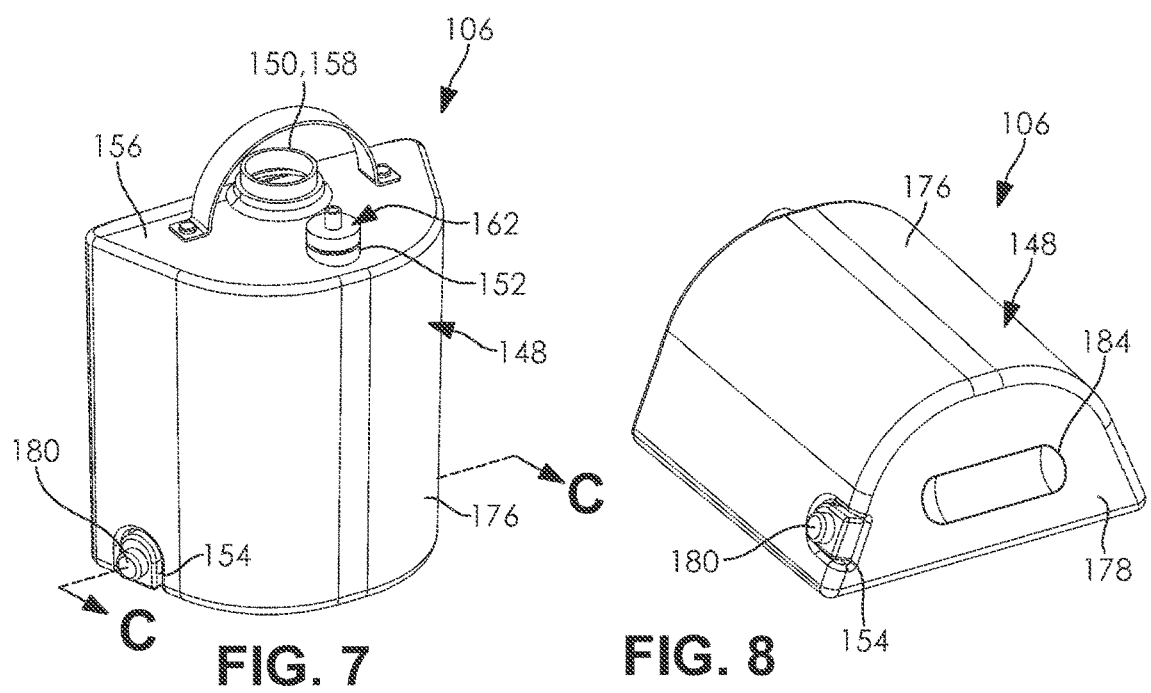
FIG. 7
FIG. 8

COMPOSTING TOILET

CROSS-REFERENCE TO RELATED APPLICATIONS

This application claims the benefit of U.S. application Ser. No. 16/576,973, filed on Sep. 20, 2019, which in turn claims the benefit of U.S. Provisional Application No. 62/790,044, filed on Jan. 9, 2019. The entire disclosures of the above applications are hereby incorporated herein by reference.

FIELD

The present disclosure relates to toilets and, more particularly, to composting toilets.

BACKGROUND

Traditional portable toilets that have been used in remote locations utilize chemicals to mask the unpleasant smell of human waste. In such chemical toilets, both the feces and urine of the user drop down into a receptacle that contains sufficient chemicals to cover the feces and urine. The chemicals prevent breakdown of the human waste and are scented to mask the odor of the waste.

However, the chemicals used in such chemical toilets are often environmentally harmful. Also, chemical toilets are limited in that these toilets are only able to contain a few days' worth of human waste, since the receptacle containing the chemicals and the human waste may begin to overflow.

Composting toilets may provide a portable toilet option without the use of chemicals. Composting toilets may have a receptacle into which both feces and urine fall. These toilets require the user to drop peat moss into the composting chamber after each use in order to absorb excess urine, since otherwise the excess urine reduces the rate of composting of the feces.

While such toilets have been found to be effective, they require that a supply of peat moss be maintained on hand. The addition of peat moss after each use makes the composting chamber fill up quickly.

There is a continuing need for a composting toilet that separates urine and fecal matter, in operation. Desirably, the composting toilet has features configured to improve the ease of use for the customer.

SUMMARY

In concordance with the instant disclosure, a composting toilet with that separates urine and fecal matter while also including features configured to improve the ease of use for the customer, has surprisingly been discovered.

In one embodiment, composting toilet assembly has a toilet bowl. The toilet bowl has a main body. The main body has a recess with a first portion and a second portion. A partition wall is disposed in the recess between the first portion and the second portion. The partition wall extends upwardly and has a top edge. There is a first opening in the first portion for receiving urine, and a second opening in the second portion for receiving fecal matter. A urine bottle is disposed adjacent to the toilet bowl. The urine bottle is in fluid communication with the first opening of the toilet bowl and configured to receive urine. The urine bottle has a drain, a handle, and a sensor configured to detect a predetermined urine level. A composting bin is disposed adjacent the toilet bowl. The composting bin is in communication with the second opening of the toilet bowl. The composting bin has an agitator, the agitator having an agitator handle configured to actuate the agitator.

In another embodiment, a composting toilet assembly has a toilet bowl with a main body. A urine bottle is in fluid communication with the toilet bowl. The urine bottle is configured to receive urine and has a drain, a handle, and a sensor. A composting bin is disposed adjacent the toilet bowl and having an agitator. The agitator handle configured to actuate the agitator. The agitator handle is disposed on a ratchet assembly. The ratchet assembly has a hub, a clutch bearing disposed in the hub, and a pair of bushings disposed in the hub. The ratchet assembly permits for a bidirectional movement of the agitator handle and a unidirectional movement of the agitator.

In a further embodiment, a composting toilet assembly has a toilet bowl with a main body. The main body has a recess with a first portion and a second portion. A partition wall is disposed in the recess between the first portion and the second portion. The partition wall extends upwardly and has a top edge. There is a first opening in the first portion for receiving urine, and a second opening in the second portion for receiving fecal matter. A urine bottle is disposed adjacent to the toilet bowl. The urine bottle is in fluid communication with the first opening of the toilet bowl and configured to receive urine. The urine bottle has a drain, a handle, and a sensor configured to detect a predetermined urine level. A composting bin is disposed adjacent the toilet bowl. The composting bin is in communication with the second opening of the toilet bowl. The composting bin has an agitator. The agitator has an agitator handle configured to actuate the agitator. The agitator handle is disposed on a ratchet assembly. The ratchet assembly has a hub, a clutch bearing disposed in the hub, and a pair of bushings disposed in the hub. The ratchet assembly permits for a bidirectional movement of the agitator handle and a unidirectional movement of the agitator.

In an exemplary embodiment, a composting toilet assembly has a bowl. The bowl has a main body and is configured to be disposed on a composting bin. A urine bottle is configured to receive urine. The bottle has a sensor, a drain, and a handle. The sensor has a device for detecting urine levels and a light for indicating the urine levels to a user. The handle has an agitator attached thereto. The handle is configured to actuate the agitator.

A composting toilet may have a bowl, a bottle, and a composting bin with an agitator handle. The bowl may be disposed on and removably coupled to the composting bin. The bowl is removably connected to the bottle. The bottle may be disposed in a sleeve on an exterior of the composting bin.

The bowl may have a main body. The main body includes a seat portion that defines an upper edge of a recessed portion. The seat may have a curved surface. Advantageously, the curved surface of the seat is configured to be ergonomic as to improve the comfort for the user in operation.

The recessed portion may have a lower portion and an upper portion. The lower portion is configured to receive urine, and the upper portion is configured to receive fecal matter, in operation. The lower portion and the upper portion may be separated by a partition. The partition defines an outer wall for each of the lower portion and the upper portion, for example. Advantageously, the partition militates against an undesired mixing of bodily fluids within the composting bin and the bottle.

The lower portion may have an opening. The opening is configured to receive urine as urine exits the recessed portion and enters the bottle. The lower portion may have a major inclined surface. The major inclined surface extends from the partition to the opening. The lower portion may have an additional curved wall that extends from the seat and curves towards the opening. Advantageously, the major inclined surface and the curved wall directs urine to the opening to facilitate movement from the bowl to the bottle.

The upper portion may have an aperture. The aperture is configured to receive fecal matter as it exits the recessed portion and enters the composing bin. The upper portion may have curved walls that extend from the seat and curve towards the aperture. Advantageously, the curved walls facilitate the movement of fecal matter from the upper portion to the bin.

The bottle may include an intake opening, a sensor aperture for a sensor, a drain, and a grab handle. The bottle may be connected directly or indirectly to the bowl.

The intake opening is formed into a top surface of the bottle. The intake opening is configured to receive urine from the opening of the lower portion of the bowl. The urine is received by the intake opening and disposed in the bottle. The intake opening may have a threaded portion configured to receive a lid.

The sensor aperture is formed into the top surface of the bottle. The sensor aperture may have a molded brass insert. The molded brass insert may be threaded. The sensor aperture is configured to receive the sensor described hereinbelow.

The drain is formed in a major exterior surface of the bottle adjacent to a rear surface of the bottle, for example. The drain may have a threaded insert configured to receive a drain valve. Advantageously, the drain valve improves the user's ability to drain the bottle. Since the drain is disposed adjacent to the rear surface of the bottle, the drain utilizes gravitational forces to empty the bottle, so the user does not have to dump the contents of the bottle manually.

The grab handle may be formed in the rear surface of the bottle. The grab handle may be a capsule shaped indent formed into the rear surface. The handle is configured to receive the user's fingers. Advantageously, the handle provides an additional grip for the user when transporting the bottle to be emptied.

The sensor may include a float device, a shaft, a threaded portion, and a light. The float device is disposed on one end of the shaft and the light is disposed on another end.

The threaded portion of the sensor is disposed on the shaft adjacent to the other end with the light. The threaded portion is configured to removably couple the sensor with the sensor aperture of the bottle. The shaft may be at least ¾ of an inch long. When the sensor is disposed in the bottle, the shaft extends into the bottle with the float extending downwardly into the bottle.

In operation, the float hangs into the bottle until the urine level reaches the float at which point, the float device may be lifted by the urine. The light of the sensor may be activated when the float is lifted. Advantageously, the sensor automatically indicates via the float and light mechanism when the bottle is full.

The agitator handle has a hub, a rod, a clutch bearing, a pair of brass bushings, and a knob. The agitator handle is disposed on an agitator bar of the composting bin. The agitator handle is secured to the agitator bar via a R-clip.

The hub may be machined from stainless steel. The hub is configured to receive the rod, the bearing, and the pair of brass bushings. The hub may be cylindrical in shape and has a hollow interior portion. The hub may also have a hole to receive the rod.

The bearing is disposed between the pair of brass bushings in the hollow interior portion of the hub. The agitator bar is disposed through each of the clutch bearing and the pair of brass bushings in order to connect the agitator handle to the composting bin. The clutch bearing may only rotate in a single direction. The rod is disposed on an exterior portion of the hub. The knob is disposed on a free end of the rod.

In operation, the agitator handle controls the agitator within the composting bin. The handle may start in an original position. The handle is then pulled in a first direction via the clutch bearing which actuates the agitator. The handle is then move back to the original position and due to the clutch bearing does not actuate the agitator. The user may the repeatedly crank the agitator handle, similar to a ratchet, in order to actuate the agitator, as desired.

DRAWINGS

The above, as well as other advantages of the present disclosure, will become readily apparent to those skilled in the art from the following detailed description, particularly when considered in the light of the drawings described hereafter.

FIG. 5 is a cross-sectional, side elevational view of the toilet bowl taken at section line B-B in FIG. 4;

FIG. 6 is an exploded top perspective view of a door handle assembly of the composting toilet assembly shown in FIG. 1;

FIG. 7 is a top perspective view of a urine bottle of the composting toilet assembly shown in FIG. 1;

FIG. 8 is a bottom perspective view of the urine bottle shown in FIG. 7;

DETAILED DESCRIPTION

The following description is merely exemplary in nature and is not intended to limit the present disclosure, application, or uses. In respect of the methods disclosed, the order of the steps presented is exemplary in nature, and thus, is not necessary or critical unless otherwise disclosed.

Figure 1:
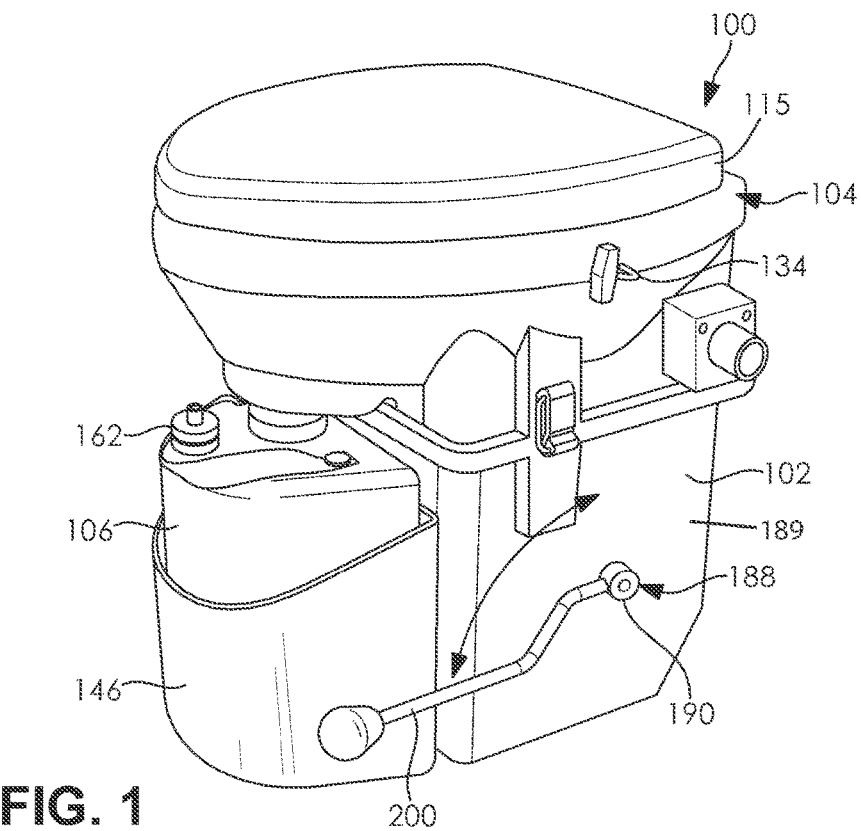
FIG. 1 is a top perspective view of a composting toilet assembly according to one embodiment of the present disclosure, shown with an elongate agitator handle.
Figure 2:
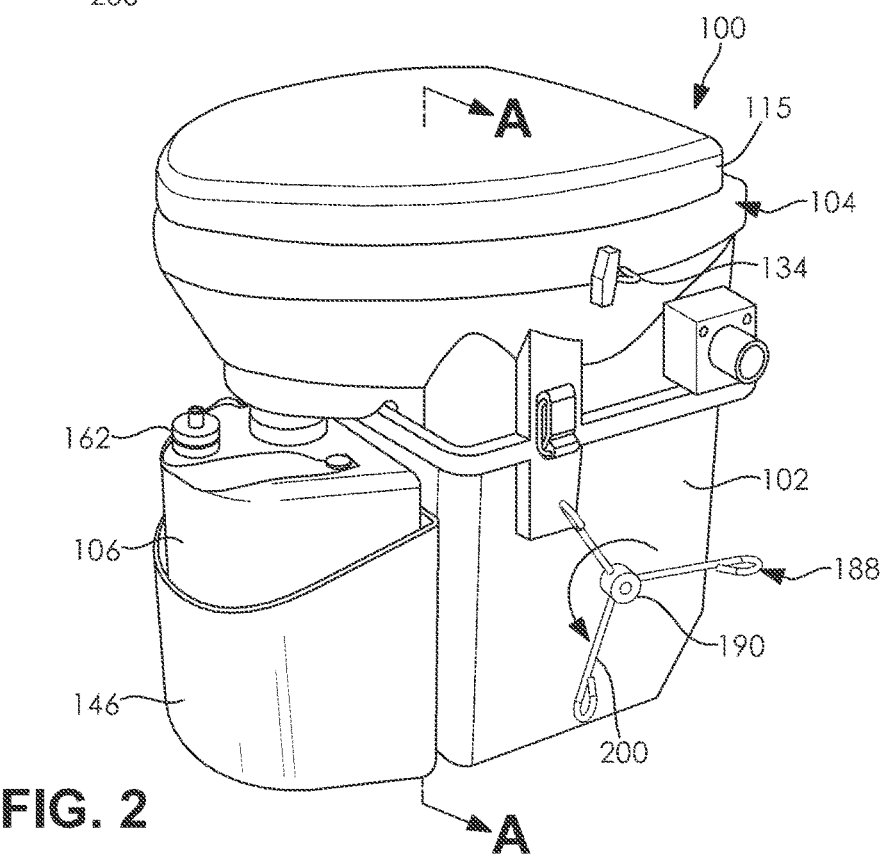
FIG. 2 is a top perspective view of the composting toilet assembly shown in FIG. 1, shown with a foot operated agitator handle.

As shown in FIGS. 1-12, a composting toilet assembly 100 may have a composting bin 102, a toilet bowl 104, and a urine bottle 106. Each of composting bin 102 and the urine bottle 106 may be disposed adjacent to the toilet bowl 104. In a particular example, as shown in FIGS. 1 and 2, the toilet bowl 104 may be removably disposed on the composting bin 102. The urine bottle 104 may be removably disposed in the composting bin 102, and in fluid communication with the toilet bowl 104.

The composting bin 102, the toilet bowl 104, and the urine bottle 106 may be fabricated from a material that is lightweight and rigid to allow the composting toilet assembly 100 to be both portable and durable. For example, the composting bin 102, the toilet bowl 104, and the urine bottle 106 may be formed from a lightweight plastic material such as a polypropylene plastic material, by a molding process such as rotation molding. In other examples, the composting bin 102, the toilet bowl 104, and the urine bottle 106 may be formed from other suitable materials including other thermoplastic materials such as polyethylene, and non-thermoplastic materials such as metal. It should be appreciated that any suitable materials and manufacturing methods for the composting bin 102, the toilet bowl 104, and the urine bottle 106 may be employed, as desired.

Figure 3:
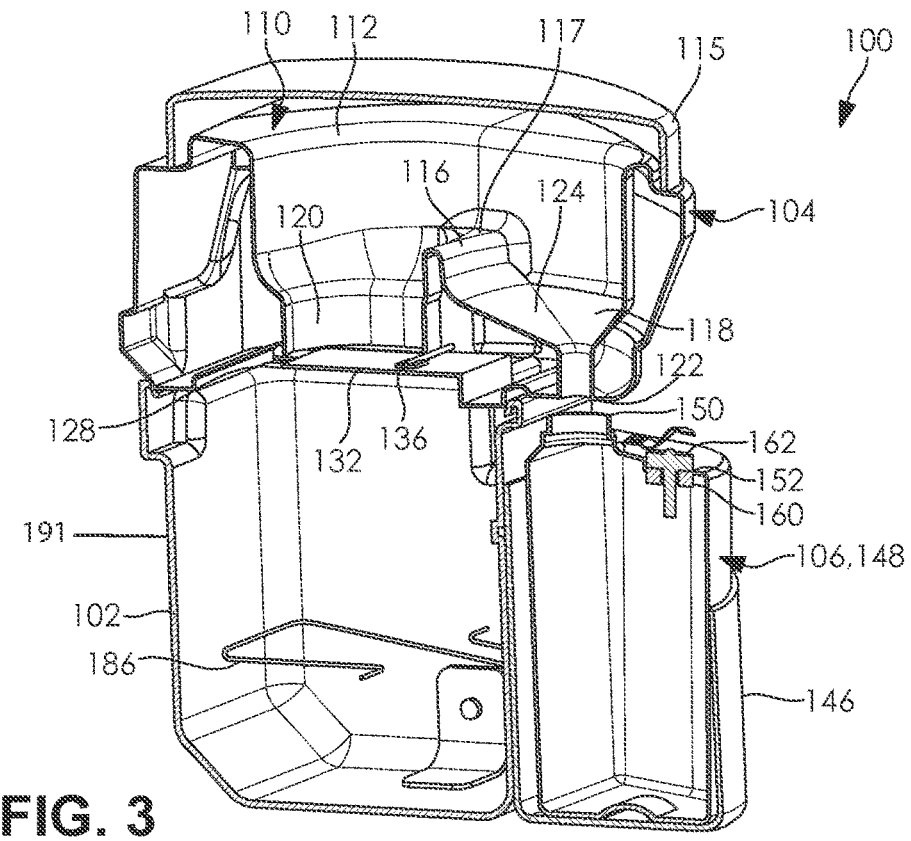
FIG. 3 is a cross-sectional, top perspective view of the composting toilet assembly taken at section line A-A in FIG. 2.

With reference to FIGS. 1-3, the toilet bowl 104 may be removably disposed on the composting bin 102. The toilet bowl 104 may be secured to the composting bin 102 via a plurality of clamps. A skilled artisan may select any suitable method to secure the toilet bowl 104 to the composting bin 102, as desired.

Figure 4:
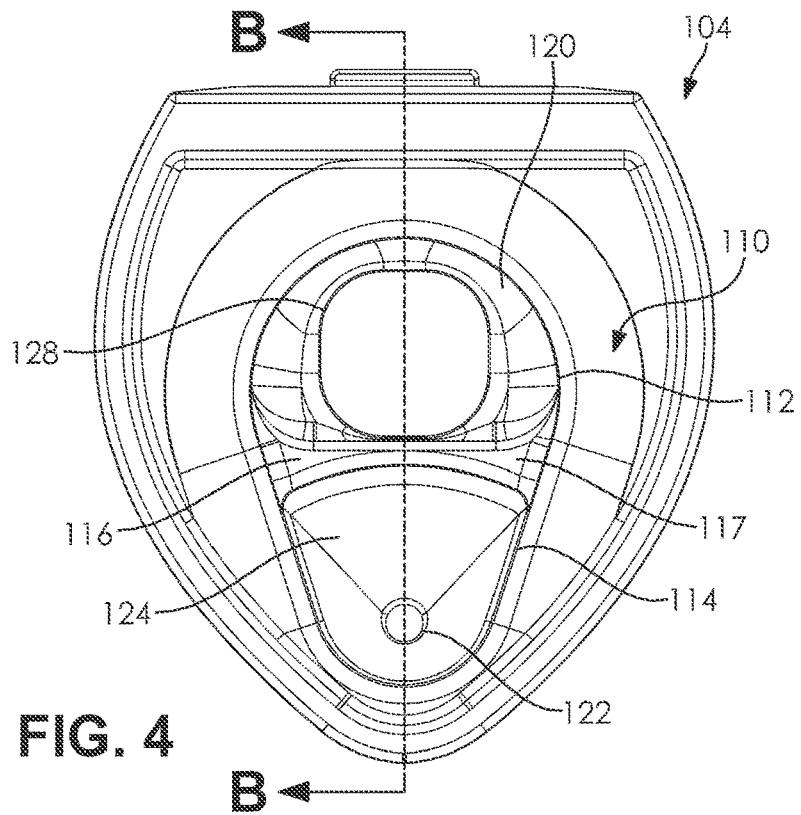
FIG. 4 is a top plan view of a toilet bowl of the composting toilet assembly shown in FIG. 1.

As depicted in FIGS. 4 and 5, the toilet bowl 104 may have a main body 108. The main body 108 may include a seat portion 110. The seat portion 110 may circumscribe and define an upper edge 112 of a recess 114 of the toilet bowl 104. Advantageously, the seat portion 110 may be ergonomically configured such that a user may comfortably sit upon the seat portion 110 while operating the composting toilet assembly 100. The composting toilet assembly 100 may also include a toilet bowl cover 115. The cover may militate against items unintentionally falling into the composting toilet assembly 100 when not in use.

The recessed portion 114 may have a partition wall 116 formed therein. The partition wall 116 may have a top edge 117. The partition wall 116 may divide the recess 114 into two separate portions, namely, a first portion 118 and a second portion 120. The first portion 118 may be configured to receive urine, in operation. The second portion 120 may be configured to receive fecal matter, in operation.

It should be understood that the partition wall 116 may militate against the undesirable mixing of urine and fecal matter within the recess 114 and the composting bin 102, in operation. The partition wall 116 may be configured to divert urine into the first portion 118.

The first portion 118 may have a first opening 122. The first opening 122 may be in fluid communication with the urine bottle 106. In operation, urine may enter the first portion 118, pass through the first opening 122, and be collected in the urine bottle 106. The first opening 122 may be directly or indirectly in communication with the urine bottle 106.

The first portion 118 may have a major inclined surface 124 and a first curved side wall 126. The major inclined surface 124 may extend from the partition wall to the first opening 122. The first curved side wall 126 may extend from the upper edge 112 to the first opening 122. The major inclined surface 124 and the first curved side wall 126 may be configured to divert urine to the first opening 122.

It should be appreciated that the major inclined surface 124 and the first curved side wall 126 may automatically divert urine. In other words, the urine may be diverted to the first opening 122 automatically without any additional actions by the user. The first portion 118 is configured to provide an easy to use composting toilet assembly 100 for the user.

The partition wall 116 may have a height configured to allow the user to operate the composting toilet assembly 100 without interference from the partition wall 116 while diverting urine to the first opening 122. The height of the partition wall 116, and likewise the top edge 117 of the partition wall 116, is such that the partition wall 116 is within the recess 114 and thereby spaced apart from the upper edge 112 of the recess 114, for example, as shown in FIGS. 3 and 5. A skilled artisan may select any suitable height for the partition wall 116, as desired.

With continued reference to FIGS. 4 and 5, the second portion 120 may have a second opening 128 formed therethrough. The second opening 128 may be in communication with the composting bin 102. In operation, fecal matter may exit the second portion 120 via the second opening 128 before reaching the composting bin 102. It should be appreciated that the second opening 128 is larger than the first opening 122 in order to accommodate the fecal matter. A skilled artisan may select any suitable size for the first opening 122 and the second 128 aperture, as desired.

The second portion 120 may be defined by the partition wall 116 and a second curved sidewall 130. Advantageously, the second portion 120 may be configured to direct fecal matter to the second opening 128.

The second portion 120 may also include a door 132. The door 132 may be disposed adjacent to the second opening 128. The door 132 may be hingedly attached to the second portion 120 adjacent to the second opening 128, as a non-limiting example. The door 132 may be configured to selectively open the second opening 128. The door 132 may be actuated by a door handle assembly 134. The door handle 134 assembly may be disposed through the toilet bowl 104 such that the user may actuate the door 132 while sitting on the composting toilet assembly 100.

Advantageously, the door 132 is configured to militate against undesirable smells emanating from the composting toilet assembly 100 when not in use. It should be appreciated that the door 132 may be actuated by any suitable method as contemplated by the present disclosure.

As shown in FIG. 6, the door handle assembly 134 may include a rod 136 and a knob 138. The rod 134 may be fabricated from steel, as a non-limiting example. The rod 136 may have a pair of ends 140. Each of the pair of ends 140 may be configured to receive the knob 138. For example, each of the pair of ends 140 may have a threaded portion 142. The knob may also have a threaded portion 144. Each of the threaded portions 142 of the rod 134 may be configured to receive the corresponding threaded portion 144 of the knob 138, thereby securing the knob to the rod 134. However, a skilled artisan may select any suitable means to secure the knob 138 to the rod 136, as desired.

It should be appreciated the threaded portion 142 of each of the pair of ends 140 may allow the handle 138 to be selectively disposed on either of the pair of ends 140. The user may, therefore, customize the location of the handle 138, as desired.

With renewed reference to FIGS. 1 and 2, the urine bottle 106 may be removably disposed in a sleeve 146 formed on a front wall of the composting bin 102. While in the sleeve 146, the urine bottle 106 may be disposed below the first opening 122 of the first portion 118.

Advantageously, the sleeve 146 may secure the urine bottle 106 in place militating against undesirable spills during operation. A skilled artisan may select any suitable means for securing the urine bottle 106 to the composting bin 102, as desired.

It should be appreciated that the toilet bowl 104 of the composting toilet assembly may be configured to divert urine to the urine bottle 106 and away from the composting bin 102. Advantageously, the toilet bowl 104 of the present disclosure may provide a composting toilet assembly 100 that is easy to use and does not require additional efforts from the user to keep urine out of the composting bin 102.

As shown in FIGS. 7 and 8, the urine bottle 106 may have a bottle body 148. The bottle body 148 may be hollow and configured to receive and store urine. The bottle body 148 may be defined by a top wall 156, a base wall 178, and at least one side wall. In certain examples, the bottle body 148 may be substantially D-shaped in cross section. The bottle body 148 may have a plurality of apertures formed therethrough, namely, an intake aperture 150, a sensor aperture 152, and a drain aperture 154.

The intake aperture 150 may be formed through the top wall 156 of the bottle body 148. The intake aperture 150 may be in fluid communication with the first opening 122 of the toilet bowl. The intake aperture 150 may be directly or indirectly connected to the first opening. In operation, urine may pass from the toilet bowl 104, through the intake aperture 150, and stored in the urine bottle 106.

In certain embodiments, the intake aperture 150 may be circumscribed by a lip 158. The lip 158 may be formed on the top wall 156 of the bottle body 148. The lip 158 may be configured to receive a lid (not shown).

Advantageously, the lip 158 may be used to connect the urine bottle 106 and the toilet bowl 104, while also providing a means for sealing the urine bottle 106. The user may transport the urine bottle 106 containing urine while militating against undesirable spills. A skilled artisan may select any suitable method for both connecting the urine bottle 106 to the toilet bowl 104 and sealing the urine bottle in operation, as desired.

The sensor aperture 152 may also be formed in the top wall 156 of the bottle body 148. A molded insert 160 may be disposed in the sensor aperture 152, for example, as shown in FIG. 3. The molded insert 160 may be a threaded ring, for example. A sensor 162 may be configured to be removably disposed in the molded insert 160.

Figure 10:
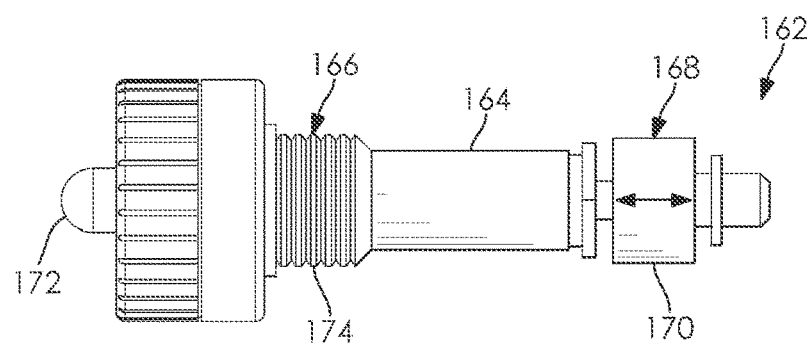
FIG. 10 is a side elevational view of a sensor of the urine bottle shown in FIG. 7.

As depicted in FIG. 10, the sensor 162 may have a shaft 164. The shaft 164 may have a first end 166 and a second end 168. The shaft 164 may have a length configured to allow the shaft to extend into the bottle body 148. The length of the shaft 164 may also be configured to detect a predetermined amount of urine within the bottle body 148, in operation. For example, the shaft 164 may be one-half inches (0.5") to two inches (2") in length. More specifically, the shaft 164 may be about three-quarters inch (0.75") in length. A skilled artisan may select any suitable length for the shaft 164, as desired.

A float device 170 may be disposed on the first end 166. The float device 170 may be disposed below the top wall 156 such that the float device 170 may extend into the bottle body 148. A light 172 may be disposed on the second end 168. The light 172 may be in electronic communication with the float device 170. Further, the light 172 may include a power source, for example, a battery disposed therein.

A threaded portion 174 may be disposed on the shaft 164 adjacent to the second end 168 be. The threaded portion 174 of the sensor 162 may corresponded to the threaded molded insert 160. The molded insert 160 and the threaded portion 174 cooperate to secure the sensor 162 within the sensor aperture 152. When the sensor 162 is secured in the sensor aperture 152, the light 172 may be disposed above the top wall 156 of the bottle body 148.

The float device 170 may be configured to actuate the light 172, in operation. More specifically, in operation, the sensor 162 may be disposed in the sensor aperture 152, and the float device 170 may hang inside the bottle body 148. When the urine level reaches the float device 170, the float device 170 may be lifted. When the float device 170 is lifted, the light 172 may be actuated. Advantageously, the user of the composting toilet assembly will be automatically notified by the light 172 that the urine bottle 106 is full.

It should be appreciated that the float device 170 may close a circuit when the predetermined urine level is reached, as a non-limiting example. In other embodiments, the float device 170 may trip a switch when the predetermined urine level is reached. A skilled artisan may select other suitable means of configuring the float device 170 to actuate the light 172, as desired.

With renewed reference to FIGS. 7 and 8, the drain aperture 154 may be formed in a major curved wall 176 of the bottle body 148 adjacent a base wall 178 of the bottle body 148. The drain aperture 154 may receive a drain valve 180. The drain aperture 154 may have a threaded insert (not shown) that may secure the drain valve 180 in the drain aperture 154. Advantageously, the drain valve 180 may improve the user's ability to drain the bottle 106 as the drain valve 180 utilizes gravitational forces to empty the bottle.

Figure 9:
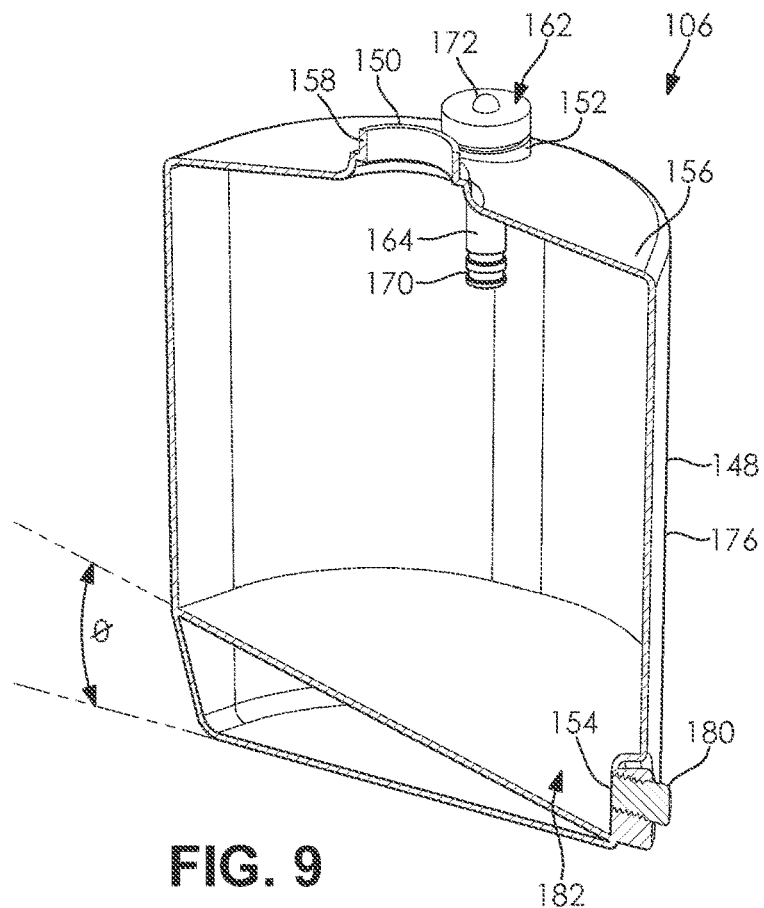
FIG. 9 is a cross-sectional, top perspective view of the urine bottle taken at section line C-C in FIG. 7, and further depicting an inclined floor formed in an interior of the urine bottle configured to divert urine to a drain.

In certain embodiments, for example as shown in FIG. 9, the bottle body 148 may have an inclined floor 182 formed therein. The inclined floor 182 may have an end disposed on the major curved wall 176 opposite the drain valve 180. The inclined floor 182 may have another end disposed on the major curved wall 176 below the drain valve 180. As shown in FIG. 9, the inclined floor 182 may be disposed at an angle ($\theta$). The angle may be defined by the angle ($\theta$) may be defined by the angle formed between the base wall 178 and the inclined floor 182. In certain embodiments, the angle ($\theta$) may be between zero degrees (0°) and thirty degrees (30°). Advantageously, the inclined floor 182 may improve the user's ability to drain the urine bottle 106 by diverting the urine to the drain valve 180.

As shown in FIG. 8, the bottle body 148 may have a grab handle 184. The grab handle 184 may be formed in the base wall 178 of the bottle body 148. For example, the grab handle 184 may be a capsule shaped indent. The handle 184 may be configured to receive the user's fingers. Advantageously, the handle 184 may provide an additional grip for the user when transporting the urine bottle 106 to be emptied. A skilled artisan may select any suitable shape and placement for the grab handle 184, as desired.

It should be appreciated that the urine bottle 106 may collect urine from the first portion 118 of the toilet bowl 104. The toilet bowl 104 and the urine bottle 106 are configured to divert urine from the composting bin 102 and to improve the ease of use for the customer.

With renewed reference to FIG. 3, the composting bin 102 may have an agitator 186 disposed therein. In operation, the composting bin 102 may be filled with peat-moss, as a non-limiting example. After the user is finished using the toilet bowl 104, the user may use the agitator 186 to mix the peat-moss compost mixture. Advantageously, the agitator 186 may mix the composting mixture, which may provide a more even compost.

The agitator 186 may have an agitator handle 188. The agitator handle 188 may be disposed on an exterior surface of the composting bin 102. The composting bin 102 may have a sidewall 189 and a rear wall 191. The agitator handle 188 may be disposed on an exterior surface of the sidewall 189 of the composting bin 102. The agitator handle 188 may be connected to the agitator 186 via a R-clip (not shown). It should be appreciated that the agitator handle 188 may allow the user to actuate the agitator 186 while sitting on the composting toilet assembly 100.

Figure 11:
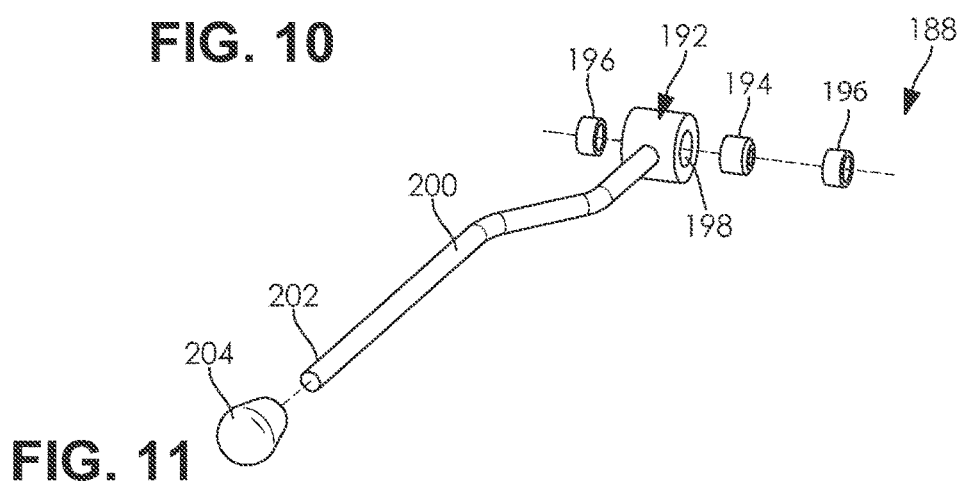
FIG. 11 is an exploded top perspective view of the agitator handle shown in FIG. 1.
Figure 12:
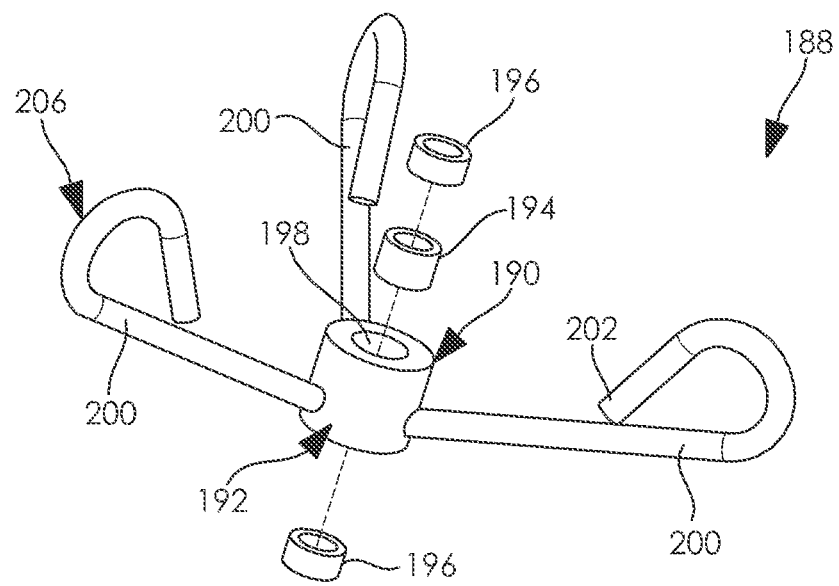
FIG. 12 is an exploded top perspective view of the agitator handle shown in FIG. 2.

As shown in FIGS. 11 and 12, the agitator handle 188 may have a ratchet assembly 190. The ratchet assembly may include a hub 192, a clutch bearing 194, and a pair of brass bushings 196.

The hub 192 may be fabricated from 316 stainless steel, as a non-limiting example. The hub 192 may be substantially cylindrical in shape with a hollow interior 198. The hollow interior 198 of the hub 192 may receive the clutch bearing 194 and the pair of brass bushings 196. A skilled artisan may select any suitable material and shape for the hub 192, as desired.

The clutch bearing 194 may be disposed in the hub 192 between each one of the brass bushings 196. A rod 187 of the agitator 186 may be disposed through the clutch bearing 194 and each of the brass bushings 196.

In certain embodiments, for example, as shown in FIG. 11, the agitator handle 188 may have an arm 200. The arm 200 may be an elongate agitator handle. A first end of the arm 200 may be disposed on an exterior surface of the hub 192. A second end of the arm 200 may be a free end 202. A knob 204 may be disposed on the second end. The elongate agitator handle 188 may have a length configured to allow the user to use the handle while sitting on the composting toilet assembly. Accordingly, the elongate agitator handle 188 may have a resting position adjacent to the toilet bowl 104.

It should be appreciated that the agitator handle 188 may be unidirectional due to the ratchet assembly 190. In operation, the agitator handle 188 may start in an original position, for example, adjacent to the toilet bowl 104. The user may push on the arm 200 in a first direction about the ratchet assembly 190, which thereby actuates the agitator 186. The elongate agitator handle 188 may be pushed forward, for example, as shown in FIG. 1. Accordingly, the elongate agitator handle 188 may be disposed adjacent to the urine bottle 106 when actuated by the user. The agitator handle 188 may then return to the original position without actuating the agitator 186. In certain embodiments, the agitator handle may automatically return to the original position via a spring mechanism (not shown), as a non-limiting example. The user may repeatedly pull or crank the arm 200 to actuate the agitator 186, as desired.

In other embodiments, for example, as shown in FIG. 12, the agitator handle 188 may have a plurality of arms 200. In a most specific example, the agitator handle 188 may have three arms 200. Each of the plurality of arms 200 may have an end disposed on the exterior surface of the hub 192 and a free end 202. The arms 200 may be evenly arranged on the exterior surface of the hub 192. A skilled artisan may select any suitable number and arrangement for the plurality of arms 200, as desired.

Each of the free ends 202 of each of the arms 200 may have a foot pedal. The foot pad 206 may be formed by having the free ends 202 curved back on itself to create a curved end, as illustrated in FIG. 12. The foot pedals 206 may have a cover (not shown) to increase traction with the user's foot, in operation. Advantageously, the foot pedals 206 of this embodiment allow a user to actuate the agitator 186 with either a hand or a foot. A skilled artisan may select any suitable shape and material for the foot pedals 202, as desired.

The composting bin 102 may further have a fan assembly (not shown). The fan assembly may force air into and out of the composting bin 102. Advantageously, the fan assembly may militate against undesirable smells near the composting toilet assembly 100. Further, airflow from the fan assembly may improve the overall quality of the compost mixture in the composting bin 102.

Advantageously, the composting toilet assembly 100 militates against the undesirable mixing of bodily fluids in the composting bin 102 by automatically separating urine and fecal matter, in operation. Further, the composting toilet assembly 100 has features configured to improve the ease of use for the customer.

While certain representative embodiments and details have been shown for purposes of illustrating the invention, it will be apparent to those skilled in the art that various changes may be made without departing from the scope of the disclosure, which is further described in the following appended claims.

What is claimed is:

1. A composting toilet assembly, comprising:
   a toilet bowl having a main body, the main body having
      a recess having a first portion and a second portion,
      a partition wall disposed in the recess and extending across an entire width of the recess between the first portion and the second portion, the partition wall extending upwardly and having a top edge,
      a first opening in the first portion for receiving urine, and
      a second opening in the second portion for receiving fecal matter;
   a urine bottle disposed adjacent to the toilet bowl, the urine bottle in fluid communication with the first opening of the toilet bowl and configured to receive urine, the urine bottle having a drain valve, a handle, and a sensor configured to detect a predetermined urine level;
   a composting bin disposed adjacent the toilet bowl, the composting bin in communication with the second opening of the toilet bowl, and the composting bin having an agitator, the agitator having an agitator handle configured to actuate the agitator, the agitator handle disposed on a sidewall of the composting bin, the agitator handle configured to enable a user to actuate the agitator while sitting on the composting toilet assembly; and
   a sleeve disposed adjacent the composting bin and disposed below the first opening of the first portion, the sleeve configured to secure the urine bottle to the composting bin.

2. The composting toilet of claim 1, wherein the toilet bowl further has a seat portion, the recess having an upper edge connected to the seat portion, the recess extending downwardly from the seat portion, the upper edge of the recess spaced apart from the top edge of the partition wall.

3. The composting toilet assembly of claim 1, wherein the first portion has a sloped surface extending from the top edge of the partition wall to the first opening and configured to divert urine to the first opening.

4. The composting toilet assembly of claim 1, wherein the toilet bowl has a door disposed adjacent to the second opening and a door handle assembly disposed through the toilet bowl, the door handle assembly attached to the door and configured to selectively open the door, the door handle assembly having a rod and a knob, the rod having a first end and a second end, the knob configured to be selectively disposed on either the first end or the second end.

5. The composting toilet assembly of claim 4, wherein each of the first end, the second end, and the knob having a threaded portion, and the knob is configured to be selectively threadably attached to either the first end or the second end.

6. The composting toilet assembly of claim 4, wherein the door of the toilet bowl is hingedly attached to the second portion adjacent to the second opening.

7. The composting toilet assembly of claim 1, wherein the sensor includes a shaft having a first end and a second end, a float assembly disposed on the first end of the shaft, and a light disposed on the second end of the shaft.

8. The composting toilet assembly of claim 7, wherein the shaft has a threaded portion configured to selectively affix the sensor to the urine bottle.

9. The composting toilet assembly of claim 7, wherein the float assembly is configured to actuate the light upon the predetermined urine level in the urine bottle being reached.

10. The composting toilet assembly of claim 1, wherein the urine bottle has top wall, at least one side wall, and a base wall, the top wall having both an intake aperture and a sensor aperture formed therein, the at least one side wall having a drain aperture formed therein, and the base wall having a grab handle.

11. The composting toilet assembly of claim 10, wherein the intake aperture of the top wall is in communication with the first opening of the toilet bowl.

12. The composting toilet assembly of claim 10, the sensor aperture of the urine bottle is defined by a threaded insert disposed in the top wall of the urine bottle.

13. The composting toilet assembly of claim 10, wherein the grab handle is an indent formed in the base wall of the urine bottle.

14. The composting toilet assembly of claim 10, wherein the urine bottle has an inclined floor configured to drain the urine bottle toward the drain aperture.

15. The composting toilet assembly of claim 14, wherein the inclined floor is disposed at an angle greater than zero degrees but less than thirty degrees.

16. The composting toilet assembly of claim 1, wherein each of the composting bin, the toilet bowl, and the urine bottle are constructed from polypropylene plastic.

17. The composting toilet assembly of claim 1, wherein each of the composting bin, the toilet bowl, and the urine bottle are constructed from polyethylene plastic.

18. The composting toilet assembly of claim 1, further comprising a clamp coupling the composting bin to the toilet bowl.

19. The composting toilet assembly of claim 1, wherein the urine bottle has a substantially D-shaped cross-section.

20. The composting toilet assembly of claim 1, wherein the sleeve is coformed with a front wall of the composting bin.

\* \* \* \* \*